(12) United States Patent
Guo

(10) Patent No.: US 11,879,781 B2
(45) Date of Patent: Jan. 23, 2024

(54) TUNEABLE FABRY-PEROT CAVITY SELF-CALIBRATION METHOD AND SPECTRUM ACQUISITION DEVICE WITH A SELF-CALIBRATION FUNCTION

(71) Applicant: SHENZHEN HYPERNANO OPTICS TECHNOLOGY CO., LTD., Shenzhen (CN)

(72) Inventor: Bin Guo, Shenzhen (CN)

(73) Assignee: SHENZHEN HYPERNANO OPTICS TECHNOLOGY CO., LTD., Shenzhen (CN)

(*) Notice: Subject to any disclaimer, the term of this patent is extended or adjusted under 35 U.S.C. 154(b) by 178 days.

(21) Appl. No.: 17/425,643

(22) PCT Filed: Nov. 19, 2019

(86) PCT No.: PCT/CN2019/119299
§ 371 (c)(1),
(2) Date: Jul. 23, 2021

(87) PCT Pub. No.: WO2021/097634
PCT Pub. Date: May 27, 2021

(65) Prior Publication Data
US 2022/0099493 A1    Mar. 31, 2022

(51) Int. Cl.
*G01J 3/45* (2006.01)
*G01J 3/28* (2006.01)

(52) U.S. Cl.
CPC .............. *G01J 3/45* (2013.01); *G01J 3/2823* (2013.01); *G01J 2003/2879* (2013.01)

(58) Field of Classification Search
CPC .... G01J 2003/2879; G01J 3/2823; G01J 3/45; G02B 26/001
See application file for complete search history.

(56) References Cited

U.S. PATENT DOCUMENTS

| 8,780,356 B1* | 7/2014 | Saari ................ H04N 17/02 356/454 |
|---|---|---|
| 2002/0094148 A1 | 7/2002 | McDaniel et al. |
| 2003/0202799 A1 | 10/2003 | Zhou et al. |

FOREIGN PATENT DOCUMENTS

| CN | 1812040 A | 8/2006 |
| CN | 101604055 A | 12/2009 |

(Continued)

OTHER PUBLICATIONS

English Translation from PCT /CN2019/119299 dated Aug. 19, 2020 (2 pages).

(Continued)

*Primary Examiner* — Maurice C Smith
(74) *Attorney, Agent, or Firm* — CALFEE, HALTER & GRISWOLD LLP

(57) ABSTRACT

A filter is irradiated with incident light, and calibrated light with a fixed wavelength is obtained after the incident light is transmitted through a calibration filter film on the filter; the calibrated light is selected and transmitted via the Fabry-Perot cavity, and selected light is obtained after the calibrated light is transmitted through the Fabry-Perot cavity; an image chip is irradiated with the selected light for imaging, and an output signal is obtained. When the selected wavelength of the tuneable Fabry-Perot cavity matches the wavelength of the calibrated light transmitted by the calibration filter film at a certain position, light at the position is selected and reaches the imaging chip, and the output signal of the imaging chip at the corresponding position can be used as a detection signal for self-calibration, which does not affect normal imaging at other positions on the filter besides the calibration filter film.

17 Claims, 3 Drawing Sheets

(56) References Cited

FOREIGN PATENT DOCUMENTS

| | | | |
|---|---|---|---|
| CN | 103558225 A | * | 2/2014 |
| CN | 104390703 A | | 3/2015 |
| CN | 107250741 A | | 10/2017 |
| JP | 2009244498 | | 10/2009 |
| JP | 2015099239 | | 5/2015 |
| JP | 2017181361 | | 10/2017 |
| JP | 2019045230 | | 3/2019 |

OTHER PUBLICATIONS

English Translation of Notice of Reasons for Refusal from JP 2022-55305 dated Nov. 16, 2022 (2 pages).

* cited by examiner

TUNEABLE FABRY-PEROT CAVITY SELF-CALIBRATION METHOD AND SPECTRUM ACQUISITION DEVICE WITH A SELF-CALIBRATION FUNCTION

CROSS REFERENCE TO RELATED APPLICATIONS

This application is a national application of PCT/CN2019/119299, filed on Nov. 19, 2019. The contents of PCT/CN2019/119299 are all hereby incorporated by reference.

FIELD

The present application relates to the field of filters, particularly to a tuneable Fabry-Perot cavity self-calibration method and a spectrum acquisition device with a self-calibration function.

BACKGROUND

The principle of a tuneable optical filter with a Fabry-Perot cavity structure can be traced back to the early multi-beam interference principle. Simply put, the Fabry-Perot cavity is composed of two mirrors capable of providing high reflectivity and a cavity capable of providing a resonance space. Incident light is restricted to the FP cavity to oscillate and interfere multiple times, and will exit when the interference light signal meets a certain condition. The filter of this structure mainly relies on adjusting the length of the F-P cavity or the refractive index of the medium in the cavity to change the resonance conditions so as to achieve the tuneable filtering effect. Therefore, the F-P cavity (Fabry-Perot cavity) has been widely used in spectral fine structure analysis, laser resonant cavity, optical filter, etc.

In the case where the Fabry-Perot cavity is applied in an optical filter, if the optical length of the cavity is an integer multiple of the half wavelength of incident light under normal incidence, light with such a wavelength can be transmitted through with low loss, while light with wavelengths that do not meet this condition will be reflected, thereby achieving the filtering function. A tuneable filter device based on the Fabry-Perot cavity interference (FPI) can be applied to miniature spectrometers and small or even mini hyperspectral cameras. In the visible-near infrared (400-1000 nm) hyperspectral imaging field, compared to other solutions, the Fabry-Perot cavity provides the simplest system structure and optical path, so it can greatly reduce the cost, volume and power consumption of such hyperspectral cameras.

Usually, the micro-tuneable Fabry-Perot cavity is driven by a voltage signal to adjust the cavity length of the Fabry-Perot cavity, and further select and transmit different wavelength bands on the spectrum. As the driving voltage increases or decreases, the relative position d (cavity length) between the two mirrors in the Fabry-Perot cavity decreases or increases. The decrease or increase in d can adjust the position of the wave peak filtered by the Fabry-Perot cavity to realize tuneable filtering on the spectrum.

The drift in the voltage control curve over temperature, mechanical and temporal changes is the main source of error during applications of the tuneable Fabry-Perot cavity. Therefore, how to reduce such errors in field application has become an important part of device and module design. The current solution is limited to use of a look-up table from off-line temperature calibration or a closed-loop control based on in-situ capacitive feedback. There is no simple and practical technical solution with respect to a calibration method for the Fabry-Perot cavity in a spectral imaging system.

In view of this, it is vital to design a calibration method and device for the Fabry-Perot cavity in a spectral imaging system.

SUMMARY

With respect to the above-mentioned problems that the voltage control curve of the tuneable Fabry-Perot cavity during applications is prone to drifts and errors along with the temperature, mechanical and temporal changes, it is difficult to reduce the errors, the operation is not simple enough, and self-calibration cannot be realized, embodiments of the present application provide a tuneable Fabry-Perot cavity self-calibration method and a spectrum acquisition device with a self-calibration function to solve the above-mentioned problems.

According to a first aspect of the present application, an embodiment of the present application provides a tuneable Fabry-Perot cavity self-calibration method, comprising the following steps:

S1: irradiating a filter with incident light, and obtaining calibrated light with a fixed wavelength after the incident light is transmitted through a calibration filter film on the filter;

S2: selecting the calibrated light via the Fabry-Perot cavity, and obtaining selected light after the calibrated light is transmitted through the Fabry-Perot cavity;

S3: irradiating an image chip with the selected light for imaging, and obtaining an output signal.

In some embodiments, in step S2, the calibrated light is selected by controlling a driving voltage applied to the Fabry-Perot cavity to obtain selected light. The driving voltage applied to the Fabry-Perot cavity and the cavity length of the Fabry-Perot cavity satisfy a certain relationship, that is, conform to the law of the control voltage curve for the Fabry-Perot cavity. By controlling the driving voltage applied to the Fabry-Perot cavity, the cavity length of the Fabry-Perot cavity can be changed to select light with a certain wavelength.

In some embodiments, the output signal comprises a calibration voltage, and the calibration voltage is the driving voltage applied to the Fabry-Perot cavity when the calibrated light is being selected. The calibration voltage corresponds to the wavelength of the calibrated light.

In some embodiments, the calibration voltage is compared with a voltage in a control voltage curve for the Fabry-Perot cavity to refit a new control voltage curve. Finally, real-time self-calibration of the Fabry-Perot cavity during applications is realized.

In some embodiments, the filter comprises a substrate and a band-pass filter film, and the band-pass filter film is coated on a surface of the substrate to enable imaging light in a certain wavelength range to be transmitted through the band-pass filter film. The band-pass filter film can increase the transmittance of the Fabry-Perot interferometer, ensuring that sufficient imaging light can transmit the Fabry-Perot cavity and irradiate the imaging chip for imaging.

In some embodiments, the calibration filter film is disposed on a portion of the filter corresponding to a clear aperture of the Fabry-Perot cavity. Therefore, the calibrated light transmitted through the calibration filter film can directly irradiate the clear aperture of the Fabry-Perot cavity.

In some embodiments, the calibration filter film is disposed on a portion of the filter corresponding to an edge position of the imaging chip. Therefore, real-time self-calibration can be realized without affecting the normal imaging function at other positions besides the calibration filter film.

In some embodiments, a plurality of calibration filter films are arranged and distributed at different portions of the filter so that light with multiple different fixed wavelengths is transmitted through the calibration filter films. By arranging a plurality of calibration filter films, multiple different calibration voltages can be obtained to achieve more accurate fitting.

According to a second aspect of the present application, an embodiment of the present application proposes a spectrum acquisition device with a self-calibration function, comprising a filter, a Fabry-Perot cavity and an imaging chip arranged successively at intervals, a portion of the filter being provided with a calibration filter film to transmit light with a fixed wavelength through the calibration filter film, light transmitted through the calibration filter film being selected by changing a voltage signal applied to the Fabry-Perot cavity, and an image signal being generated by the imaging chip.

In some embodiments, the filter comprises a substrate and a band-pass filter film, and the band-pass filter film is coated on a surface of the substrate to enable imaging light in a certain wavelength range to be transmitted through the band-pass filter film.

In some embodiments, the calibration filter film is disposed on a portion of the filter corresponding to a clear aperture of the Fabry-Perot cavity. Therefore, the calibrated light transmitted through the calibration filter film can directly irradiate the clear aperture of the Fabry-Perot cavity.

In some embodiments, the calibration filter film is disposed on a portion of the filter corresponding to an edge position of the imaging chip. Therefore, real-time self-calibration can be realized without affecting the normal imaging function at other positions besides the calibration filter film.

In some embodiments, a plurality of calibration filter films are arranged and distributed at different positions of the filter so that light with multiple different wavelengths is transmitted through the calibration filter films. By arranging a plurality of calibration filter films, multiple different calibration voltages can be obtained to achieve more accurate fitting.

In some embodiments, a driving voltage applied to the Fabry-Perot cavity when light transmitted through the calibration filter film is being selected and transmitted by the Fabry-Perot cavity is a calibration voltage, and the calibration voltage is compared with a voltage in a control voltage curve of the Fabry-Perot cavity to refit a new control voltage curve. Finally, real-time self-calibration of the Fabry-Perot cavity during applications is realized.

An embodiment of the present application discloses a tuneable Fabry-Perot cavity self-calibration method. The control voltage curve of the Fabry-Perot cavity is fitted by disposing a calibration filter film. Only when the selected wavelength of the tuneable Fabry-Perot cavity matches the wavelength of the calibrated light transmitted by the calibration filter film at a certain position, light at said position is selected and reaches the imaging chip, and the output signal of the imaging chip at the corresponding position can be used as a detection signal for self-calibration, which does not affect normal imaging at other positions on the filter besides the calibration filter film. The method is simple to operate, accurate and feasible. Another embodiment of the present application discloses a spectrum acquisition device with a self-calibration function, through which the above-mentioned tuneable Fabry-Perot cavity self-calibration method can be used to realize real-time self-calibration of the tuneable Fabry-Perot cavity. The device is simple in structure and low in cost.

BRIEF DESCRIPTION OF THE DRAWINGS

The drawings are included to provide a further understanding of the embodiments, and the drawings are incorporated into this specification and constitute a part of this specification. The drawings illustrate the embodiments and together with the description serve to explain the principles of the present application. It will be easy to recognize other embodiments and many expected advantages of the embodiments because they become better understood by referring to the following detailed description. The elements in the drawings are not necessarily in proportion to each other. The same reference numerals refer to corresponding similar components.

DETAILED DESCRIPTION

Figure 1:
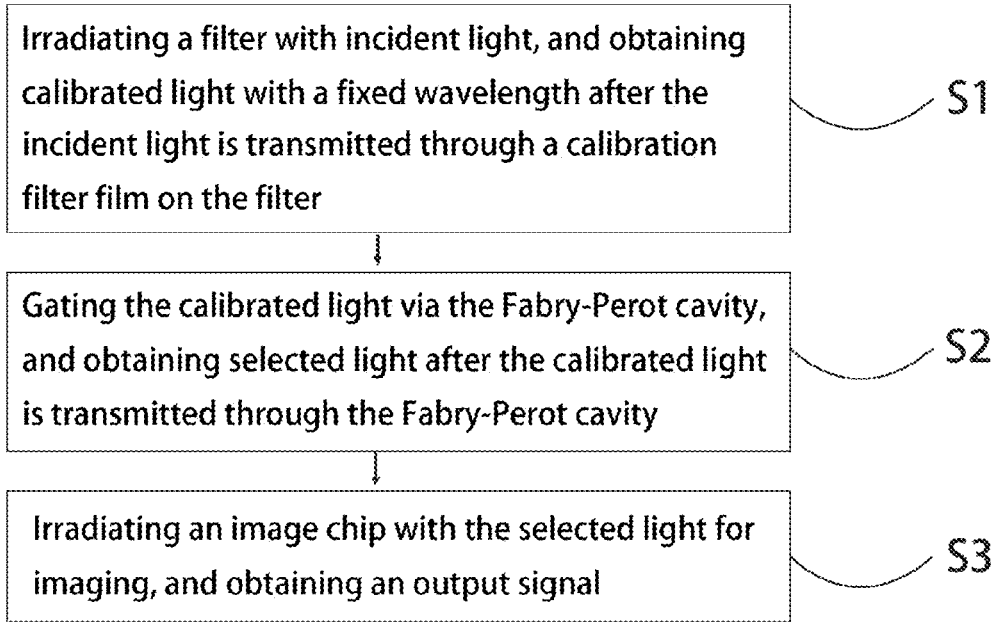
FIG. 1 is a flowchart of a tuneable Fabry-Perot cavity self-calibration method in an embodiment of the present application.

The present application will be further described in detail below with reference to the drawings and embodiments. It can be understood that specific embodiments described here are only used to explain the relevant application, rather than to limit this application. In addition, it is to be noted that, to facilitate description, only the portions related to the relevant application are shown in the drawings.

It is to be noted that the embodiments in the present application and the features in the embodiments can be combined with each other in the case of causing no conflict. Hereinafter, the present application will be described in detail with reference to the drawings and in conjunction with the embodiments.

As shown in FIG. 1, an embodiment of the present application provides a tuneable Fabry-Perot cavity self-calibration method, comprising the following steps:

S1: irradiating a filter with incident light, and obtaining calibrated light with a fixed wavelength after the incident light is transmitted through a calibration filter film on the filter;

S2: selecting the calibrated light via the Fabry-Perot cavity, and obtaining selected light after the calibrated light is transmitted through the Fabry-Perot cavity;

S3: irradiating an image chip with the selected light for imaging, and obtaining an output signal.

Figure 2:
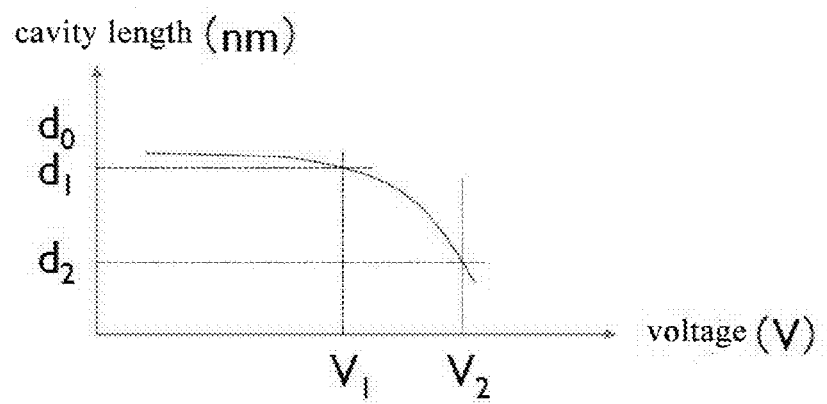
FIG. 2 is a schematic view illustrating a control voltage curve of a Fabry-Perot cavity in a tuneable Fabry-Perot cavity self-calibration method in an embodiment of the present application.

In a specific embodiment, in step S2, the calibrated light is selected by controlling the driving voltage applied to the Fabry-Perot cavity to obtain selected light. For a micro tuneable Fabry-Perot cavity, the Fabry-Perot cavity is usually driven by a voltage signal, which specifically includes two ways. One is to form two opposite electrodes on two mirrors of the Fabry-Perot cavity and apply a voltage on the two electrodes to form a capacitance-driven Fabry-Perot cavity. The other is to drive a movable mirror of the Fabry-Perot cavity to move by means of a piezoelectric actuator, and apply a voltage on the sidewall electrodes of the piezoelectric actuator to drive the piezoelectric actuator. Therefore, the length of the Fabry-Perot cavity is changed by changing the voltage signal, and light is selected. In a preferred embodiment, the cavity length of the Fabry-Perot cavity is controlled in the manner of capacitive driving, and the driving voltage applied to the Fabry-Perot cavity satisfies a certain relationship with the cavity length of the Fabry-Perot cavity, so that the control voltage curve of the Fabry-Perot cavity shown in FIG. 2 can be obtained and satisfies the following formula:

$$V=\sqrt{2k(d_0-d)/\varepsilon_0 A}$$

wherein V represents the driving voltage applied to the Fabry-Perot cavity; k represents the elastic coefficient of the structure of the Fabry-Perot cavity; $\varepsilon_0$ represents the dielectric constant in vacuum; A represents the area of the capacitance-driven electrode of the Fabry-Perot cavity; $d_0$ is the initial cavity length of the Fabry-Perot cavity; d is the current cavity length of the Fabry-Perot cavity. As shown in FIG. 2, when the driving voltage applied to the Fabry-Perot cavity is $V_1$, the corresponding cavity length of the Fabry-Perot cavity is $d_1$, and when the driving voltage applied to the Fabry-Perot cavity is $V_2$, the corresponding cavity length of the Fabry-Perot cavity is $d_2$. Therefore, as the driving voltage increases or decreases, the cavity length of the Fabry-Perot cavity decreases or increases accordingly. The cavity length of the Fabry-Perot cavity and the wavelength of light satisfy the following formula:

$$\lambda=2d/m$$

wherein $\lambda$ is the wavelength of the selected light, d is the current cavity length of the Fabry-Perot cavity, and m is a positive integer.

The wavelength of the light that is selected after being transmitted through the Fabry-Perot cavity can be calculated from the above two formulas. On the contrary, the driving voltage applied to the Fabry-Perot cavity can be calculated by knowing the wavelength of the light that is selected after being transmitted through the Fabry-Perot cavity. When the calibrated light is selected after being transmitted through the Fabry-Perot cavity, the driving voltage actually measured for the Fabry-Perot cavity at that time is a calibration voltage, and the calibration voltage corresponds to the wavelength of the calibrated light. Therefore, based on the wavelength of the calibrated light, the driving voltage applied to the Fabry-Perot cavity can be calculated according to the above two formulas. By comparing the calculated driving voltage with the actually measured calibration voltage, the control voltage curve of the Fabry-Perot cavity can be refitted without affecting the imaging effect of normal imaging light, so as to realize the real-time self-calibration function. In other optional embodiments, the voltage and cavity length of the Fabry-Perot cavity driven by other voltage signals satisfy other control voltage curve formulas, and the above method may also be used to perform self-calibration on the Fabry-Perot cavity.

In a specific embodiment, the filter includes a substrate and a band-pass filter film, and the band-pass filter film is coated on the surface of the substrate to enable imaging light in a certain wavelength range to be transmitted through the band-pass filter film. Since the transmittance of the Fabry-Perot interferometer itself is not ideal so that the forbidden band transmittance is excessively high, the transmittance of the Fabry-Perot interferometer can be increased by disposing a band-pass filter film so as to ensure that sufficient imaging light is transmitted through the Fabry-Perot cavity and irradiates the imaging chip for imaging. In a preferred embodiment, the band-pass filter film is disposed on a side of the substrate facing the calibration filter film. That is, a layer of band-pass filter film is firstly coated on the substrate, and then a small piece of calibration filter film is coated on a portion of the band-pass filter film. Of course, the band-pass filter film may also be disposed on a side of the substrate away from the calibration filter film. That is, a calibration filter film is provided on one side of the substrate, and a band-pass filter film is provided on the other side of the substrate. The optical paths of the band-pass filter film and the calibration filter film may or may not overlap. In the case where the optical paths of the calibration filter film and the band-pass filter film overlap, the band-pass filter film can transmit imaging light in a certain wavelength range, and the calibration filter film can transmit light with a certain fixed wavelength within a certain wavelength range. In addition, the substrate is a transparent substrate, including a glass substrate or other optical resin substrates. As a result, the light imaging effect of a spectral imaging system can be effectively improved, and the device is simple in structure, low in cost and high in accuracy.

In a specific embodiment, the calibration filter film is disposed on a portion of the filter corresponding to the clear aperture of the Fabry-Perot cavity. Therefore, the calibrated light transmitted through the calibration filter film can directly irradiate the clear aperture of the Fabry-Perot cavity, without exceeding the clear aperture of the Fabry-Perot cavity to affect the calibration effect. In a preferred embodiment, the calibration filter film is disposed on a portion of the filter corresponding to an edge position of the imaging chip. Disposing the calibration filter film on the position corresponding to the edge position of the imaging chip can not only realize real-time calibration, but also does not affect the normal imaging function at other positions besides the calibration filter film, so that the purpose of self-calibration is finally achieved.

Figure 3:
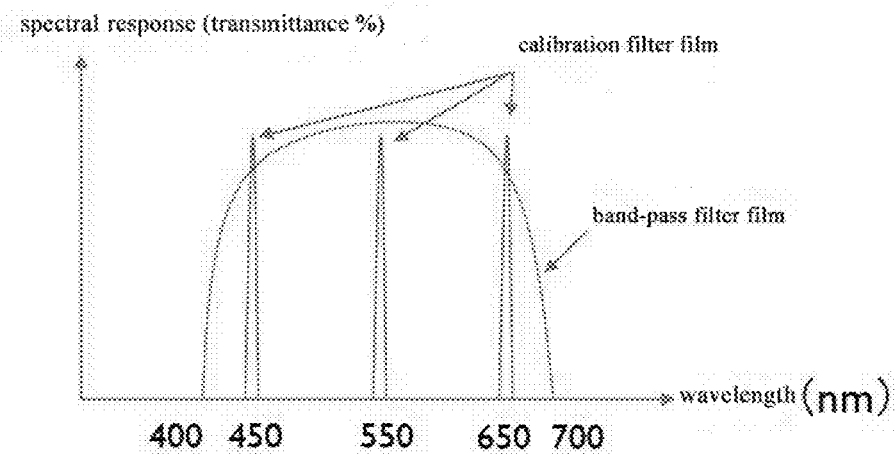
FIG. 3 is a spectral response diagram of a tuneable Fabry-Perot cavity self-calibration method in an embodiment of the present application.

In a specific embodiment, a plurality of calibration filter films are arranged and distributed at different portions of the filter so that light with multiple different fixed wavelengths is transmitted through the calibration filter films. By arranging a plurality of calibration filter films, multiple different calibration voltages can be obtained to achieve more accurate fitting. In a preferred embodiment, three calibration filter films may be provided, which are disposed on endpoints corresponding to the edges of the imaging chip, respectively. The band-pass filter film can transmit light in a certain wavelength range on the spectrum, and the calibration filter film only transmits narrow-band light with a fixed wavelength, so the three calibration filter films correspond to three different wavelength positions in the band-pass filter spectral range. Finally, the spectral response diagram shown in FIG. 3 is obtained. Moreover, there are three calibration voltages so that the imaging chip pixels corresponding to the three positions have signal output. The three calibration voltages are compared with the voltages corresponding to the respective wavelengths in the control voltage curve originally calibrated by the Fabry-Perot cavity. If there is a shift, a new control voltage curve can be refitted according to the above formulas, so as to realize real-time self-calibration of the Fabry-Perot cavity during the spectral imaging application.

Figure 4:
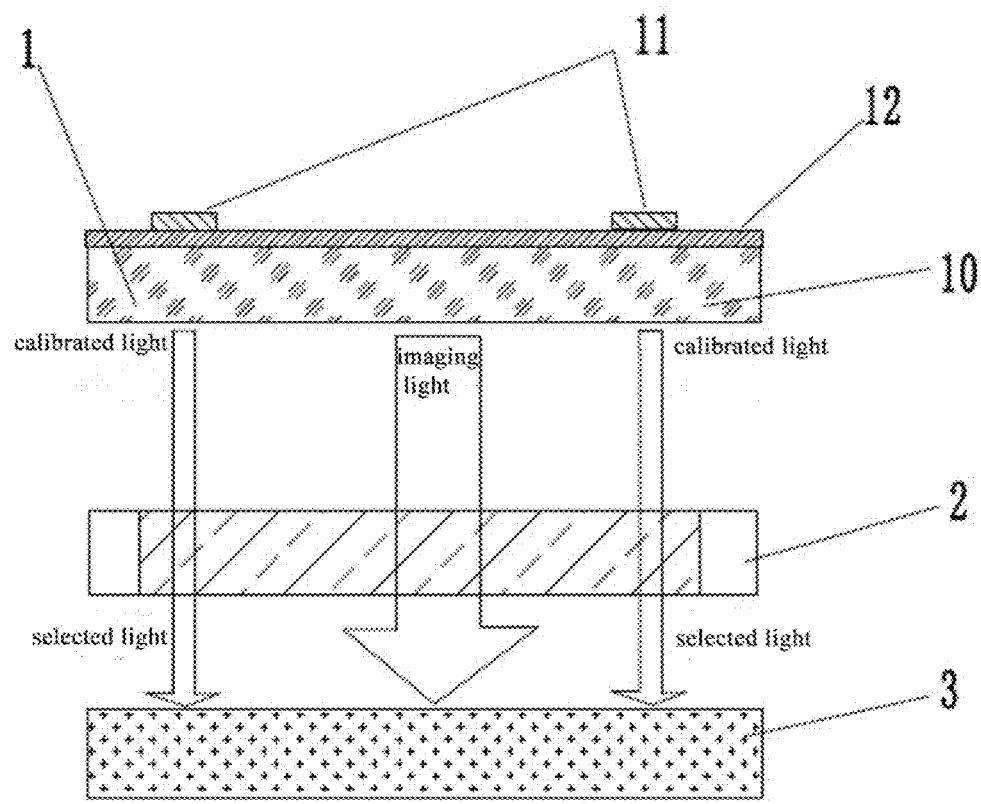
FIG. 4 is a schematic view illustrating a spectrum acquisition device with a self-calibration function in an embodiment of the present application.

With respect to the tuneable Fabry-Perot cavity self-calibration method proposed in the embodiment of the present application, a spectrum acquisition device with a self-calibration function is proposed accordingly, which can perform self-calibration using the tuneable Fabry-Perot cavity self-calibration method. As shown in FIG. 4, the spectrum acquisition device comprises a filter 1, a Fabry-Perot cavity 2 and an imaging chip 3 arranged successively at intervals. A calibration filter film 11 is disposed on portions of the filter 1 to enable light with a fixed wavelength to be transmitted through the calibration filter film 11. The voltage signal for the Fabry-Perot cavity 2 is changed to select the light transmitted through the calibration filter film 11, and an image signal is generated by the imaging chip 3.

Figure 5:
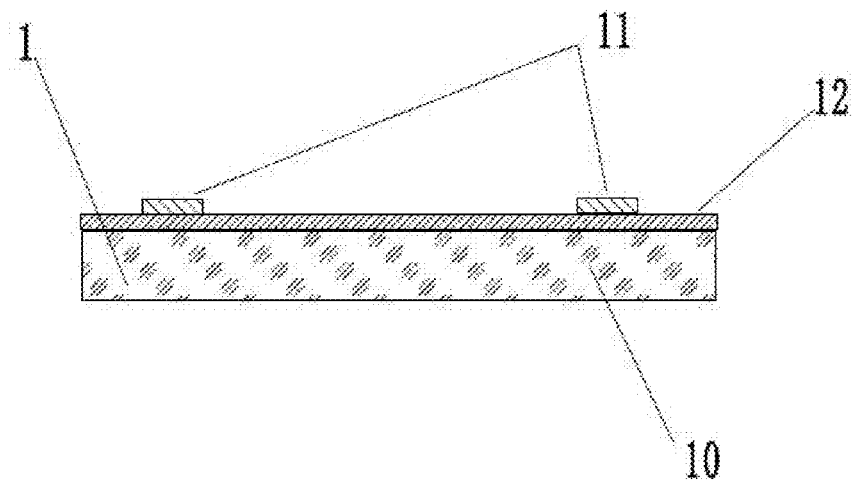
FIG. 5 is a sectional view of a filter of a spectrum acquisition device with a self-calibration function in an embodiment of the application.

In a specific embodiment, as shown in FIG. 5, the filter 1 comprises a substrate 10 and a band-pass filter film 12. The band-pass filter film 12 is coated on the surface of the substrate 10 to transmit imaging light in a certain wavelength range through the band-pass filter film 12. Since the transmittance of the Fabry-Perot cavity itself is not ideal so that the forbidden band transmittance is excessively high, the transmittance of the device can be increased by disposing a band-pass filter film 12 so as to ensure that sufficient imaging light is transmitted through the Fabry-Perot cavity 2 and irradiates the imaging chip for imaging. In a preferred embodiment, the band-pass filter film 12 is disposed on a side of the substrate 10 facing the calibration filter film 11. That is, a layer of band-pass filter film 12 is firstly coated on the substrate 10, and then a small piece of calibration filter film 11 is coated on a portion of the band-pass filter film 12. Of course, the band-pass filter film may also be disposed on a side of the substrate 10 away from the calibration filter film 11. That is, a calibration filter film 11 is provided on one side of the substrate 10, and a band-pass filter film 12 is provided on the other side of the substrate 10. The optical paths of the band-pass filter film 12 and the calibration filter film 11 may or may not overlap. In the case where the optical paths of the calibration filter film 11 and the band-pass filter film 12 overlap, the band-pass filter film 12 can transmit imaging light in a certain wavelength range, and the calibration filter film 11 can transmit light with a certain fixed wavelength within a certain wavelength range. In addition, the substrate 10 is a transparent substrate, including a glass substrate or other optical resin substrates. As a result, the spectrum acquisition device is simple in structure, low in cost and high in accuracy.

Figure 6:
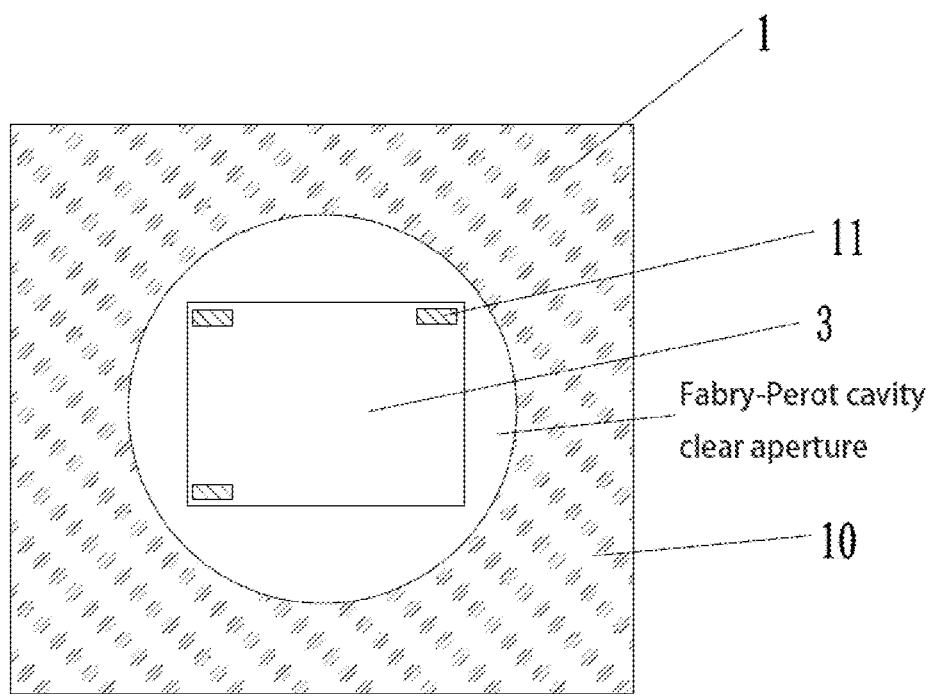
FIG. 6 is a top view of a filter of a spectrum acquisition device with a self-calibration function in an embodiment of the present application.

In a specific embodiment, as shown in FIG. 6, the calibration filter film 11 is disposed on portions of the filter 1 corresponding to positions within the clear aperture of the Fabry-Perot cavity 2. Therefore, the calibrated light transmitted through the calibration filter film 11 can directly irradiate the clear aperture of the Fabry-Perot cavity 2 without exceeding the clear aperture of the Fabry-Perot cavity 2 to affect the calibration. In a preferred embodiment, the calibration filter film 11 is disposed on portions of the filter 1 corresponding to edge positions of the imaging chip 3. Disposing the calibration filter film 11 on portions corresponding to edge positions of the imaging chip 3 can not only realize real-time calibration, but also does not affect the normal imaging function at other positions besides the calibration filter film 11, so that the purpose of self-calibration is finally achieved.

In a specific embodiment, a plurality of calibration filter films 11 are arranged and distributed at different portions of the filter 1 so that light with multiple different wavelengths is transmitted through the calibration filter films 11. By arranging a plurality of calibration filter films 11, multiple different calibration voltages can be obtained to achieve more accurate fitting. In a preferred embodiment, three calibration filter films 11 may be arranged, which are disposed on endpoints corresponding to edges of the imaging chip 3, respectively. The band-pass filter film 12 can transmit light in a certain wavelength range on the spectrum, and the calibration filter film 11 only transmits narrow-band light with a fixed wavelength, so the three calibration filter films 11 correspond to three different wavelength positions in the band-pass filter spectral range. Moreover, there are three calibration voltages so that the imaging chip pixels corresponding to the three positions have signal output. Finally, the spectral response diagram shown in FIG. 3 is obtained. The three calibration voltages are compared with the voltages corresponding to the respective wavelengths in the control voltage curve originally calibrated by the Fabry-Perot cavity 2. If there is a shift, a new control voltage curve can be refitted according to the above formulas, so as to realize real-time self-calibration of the Fabry-Perot cavity 2 during the spectral imaging application.

In a specific embodiment, the driving voltage applied to the Fabry-Perot cavity 2 when the light transmitted through the calibration filter film 11 is being selected and transmitted by the Fabry-Perot cavity 2 is a calibration voltage, and the calibration voltage is compared with the voltage in the control voltage curve of the Fabry-Perot cavity 2 to refit a new control voltage curve. Finally, real-time self-calibration of the Fabry-Perot cavity 2 is realized.

An embodiment of the present application discloses a tuneable Fabry-Perot cavity self-calibration method, comprising: irradiating a filter with incident light, and obtains calibrated light with a fixed wavelength after the incident light is transmitted through a calibration filter film on the filter; selecting the calibrated light via the Fabry-Perot cavity, and obtaining selected light after the calibrated light is transmitted through the Fabry-Perot cavity; irradiating an image chip with the selected light for imaging, and obtaining an output signal. The control voltage curve of the Fabry-Perot cavity is fitted by disposing a calibration filter film. Only when the selected wavelength of the tuneable Fabry-Perot cavity matches the wavelength of the calibrated light transmitted by the calibration filter film at a certain position, light at said position is selected and reaches the imaging chip, and the output signal of the imaging chip at the corresponding position can be used as a detection signal for self-calibration, which does not affect normal imaging at other positions on the filter besides the calibration filter film. The method is simple to operate, accurate and feasible. Another embodiment of the present application discloses a spectrum acquisition device with a self-calibration function, through which the above-mentioned tuneable Fabry-Perot cavity self-calibration method can be used to realize real-time self-calibration of the tuneable Fabry-Perot cavity. The device is simple in structure, low in cost, and high in calibration accuracy.

What have been described above are implementations of the present application, but the protection scope of the present application is not so limited. Any variation or substitution that can be easily conceived by a skilled person familiar with this technical field shall be encompassed within the protection scope of the present application. Therefore, the protection scope of the present application shall be based on the protection scope of the claims.

In the description of the present application, it should be understood that the orientations or positional relationships indicated by the terms "upper", "lower", "inner", "outer", etc. are based on the orientations or positional relationships shown in the drawings, and are only for the convenience of describing the present application and simplifying the description, rather than indicating or implying that the device or element referred to must have a specific orientation or be configured and operated in a specific orientation, and therefore cannot be understood as a limitation to the present application. The word "comprising" does not exclude the presence of elements or steps not listed in the claims. The wording "a" or "one" in front of an element does not exclude the existence of a plurality of such elements. The mere fact that certain measures are recited in mutually different dependent claims does not indicate that a combination of these measures cannot be used for improvement. Any reference sign in the claims should not be construed as limiting the scope.

The invention claimed is:

1. A tunable Fabry-Perot cavity self-calibration method, comprising the following steps:
   S1: irradiating a filter with incident light, and obtaining calibrated light with a fixed wavelength after the incident light is transmitted through a calibration filter film on the filter;
   S2: gating the calibrated light via the Fabry-Perot cavity, and obtaining selected light after the calibrated light is transmitted through the Fabry-Perot cavity; and
   S3: irradiating an image chip with the selected light for imaging, so that obtain an output signal,
   wherein, in step S2, the calibrated light is selected by controlling a driving voltage for the Fabry-Perot cavity to obtain selected light.

2. The tunable Fabry-Perot cavity self-calibration method according to claim 1, wherein, the output signal comprises a calibration voltage which is the driving voltage for the Fabry-Perot cavity when the calibrated light is being selected.

3. The tunable Fabry-Perot cavity self-calibration method according to claim 2, wherein, the calibration voltage is compared with a voltage in a control voltage curve of the Fabry-Perot cavity to refit a new control voltage curve.

4. The tunable Fabry-Perot cavity self-calibration method according to claim 1, wherein, the filter comprises a substrate and a band-pass filter film, and the band-pass filter film is coated on a surface of the substrate to enable imaging light in a certain wavelength range to be transmitted through the band-pass filter film.

5. The tunable Fabry-Perot cavity self-calibration method according to claim 1, wherein the calibration filter film is disposed on a portion of the filter corresponding to a clear aperture of the Fabry-Perot cavity.

6. The tunable Fabry-Perot cavity self-calibration method according to claim 1, wherein the calibration filter film is disposed on a portion of the filter corresponding to a edge portion of the imaging chip.

7. The tunable Fabry-Perot cavity self-calibration method according to claim 1, wherein a plurality of calibration filter films are arranged and distributed at different positions of the filter so that light with multiple different fixed wavelengths is transmitted through the calibration filter films.

8. A spectrum acquisition device with a self-calibration function, comprising a filter, a Fabry-Perot cavity and an imaging chip arranged successively at intervals, a portion of the filter being provided with a calibration filter film for transmitting light with a fixed wavelength, light transmitted through the calibration filter film being selected by changing a voltage signal for the Fabry-Perot cavity, and an image signal being generated by the imaging chip.

9. The spectrum acquisition device with a self-calibration function according to claim 8, wherein the filter comprises a substrate and a band-pass filter film, and the band-pass filter film is coated on a surface of the substrate to enable imaging light in a certain wavelength range to be transmitted through the band-pass filter film.

10. The spectrum acquisition device with a self-calibration function according to claim 8, wherein the calibration filter film is disposed on a portion of the filter corresponding to a clear aperture of the Fabry-Perot cavity.

11. The spectrum acquisition device with a self-calibration function according to claim 8, wherein the calibration filter film is disposed on a portion of the filter corresponding to edge portion of the imaging chip.

12. The spectrum acquisition device with a self-calibration function according to claim 8, wherein a plurality of calibration filter films are arranged and distributed at different positions of the filter so that light with multiple different wavelengths is transmitted through the calibration filter films.

13. The spectrum acquisition device with a self-calibration function according to claim 8, wherein a driving voltage for the Fabry-Perot cavity when light transmitted through the calibration filter film is being selected by the Fabry-Perot cavity is called a calibration voltage, and the calibration voltage is compared with a voltage in a control voltage curve of the Fabry-Perot cavity to refit a new control voltage curve.

14. The spectrum acquisition device with a self-calibration function according to claim 9, wherein a driving voltage for the Fabry-Perot cavity when light transmitted through the calibration filter film is being selected by the Fabry-Perot cavity is called a calibration voltage, and the calibration voltage is compared with a voltage in a control voltage curve of the Fabry-Perot cavity to refit a new control voltage curve.

15. The spectrum acquisition device with a self-calibration function according to claim 10, wherein a driving voltage for the Fabry-Perot cavity when light transmitted through the calibration filter film is being selected by the Fabry-Perot cavity is called a calibration voltage, and the calibration voltage is compared with a voltage in a control voltage curve of the Fabry-Perot cavity to refit a new control voltage curve.

16. The spectrum acquisition device with a self-calibration function according to claim 11, wherein a driving voltage for the Fabry-Perot cavity when light transmitted through the calibration filter film is being selected by the Fabry-Perot cavity is called a calibration voltage, and the calibration voltage is compared with a voltage in a control voltage curve of the Fabry-Perot cavity to refit a new control voltage curve.

17. The spectrum acquisition device with a self-calibration function according to claim 12, wherein a driving voltage for the Fabry-Perot cavity when light transmitted through the calibration filter film is being selected by the Fabry-Perot cavity is called a calibration voltage, and the calibration voltage is compared with a voltage in a control voltage curve of the Fabry-Perot cavity to refit a new control voltage curve.

\* \* \* \* \*